United States Patent [19]
Vanderwerf

[11] Patent Number: 4,744,641
[45] Date of Patent: May 17, 1988

[54] TELEPHOTO LENS ASSEMBLY FOR OVERHEAD PROJECTOR

[75] Inventor: Dennis Vanderwerf, Cottage Grove, Minn.

[73] Assignee: Minnesota Mining and Manufacturing Company, St. Paul, Minn.

[21] Appl. No.: 56,443

[22] Filed: Jun. 1, 1987

[51] Int. Cl.⁴ .................. G02B 17/08; G02B 9/34
[52] U.S. Cl. .................................................. 350/445
[58] Field of Search ................... 350/445, 456, 462

[56] References Cited

U.S. PATENT DOCUMENTS

| | | | |
|---|---|---|---|
| 3,126,786 | 3/1964 | Appeldorn . | |
| 3,334,957 | 8/1967 | Field | 350/203 |
| 4,350,415 | 9/1982 | Conrad | 350/422 |
| 4,380,374 | 4/1983 | Vanderwerf | 350/423 |

Primary Examiner—John K. Corbin
Assistant Examiner—Rebecca D. Gass
Attorney, Agent, or Firm—Donald M. Sell; James A. Smith; David W. Anderson

[57] ABSTRACT

The invention consists of a four-element telephoto projection lens for use in conventional overhead projectors, which lens assembly affords an extended projection distance from the lens to the projection screen while retaining the same back focus as conventional two-element projection lenses for overhead projectors.

6 Claims, 1 Drawing Sheet

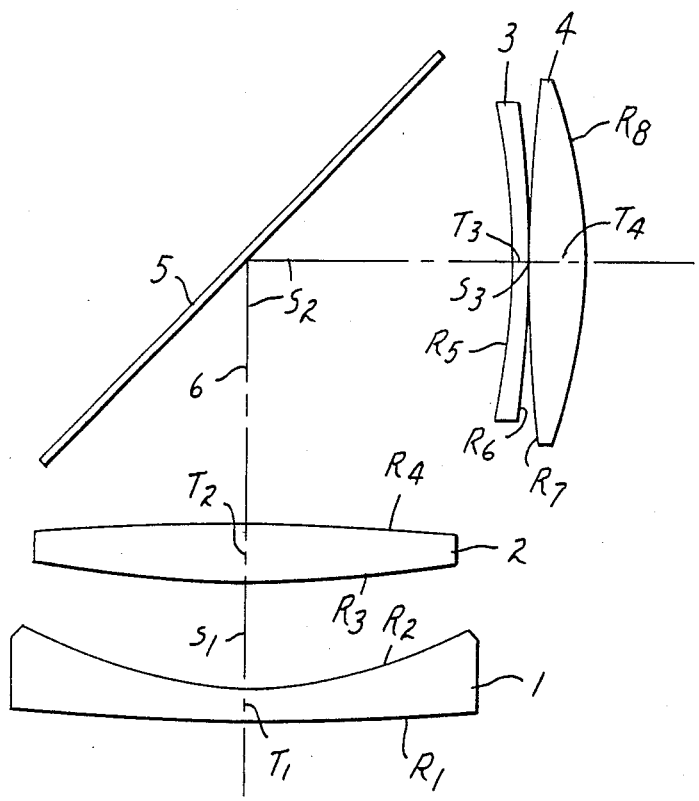

TELEPHOTO LENS ASSEMBLY FOR OVERHEAD PROJECTOR

BACKGROUND OF THE INVENTION

1. Technical Field of the Invention

This invention relates to overhead projectors and, in particular, projection lenses used with such projectors.

2. Description of the Prior Art

Overhead projection lenses take many forms, the most conventional form in use today being a two-element projection lens assembly utilizing two spaced positive meniscus lenses, one to direct light toward a mirror reflector and the other to receive light from the mirror to project an image from a stage located below the projection lens assembly to a vertical projection screen or surface. The projected image is focused by movement of the projection lens assembly toward and away from the stage upon which the transparency to be projected is placed. Conventional two-element projection lenses are illustrated and described in such publications as U.S. Pat. Nos. 3,126,786 and 3,334,957.

Such conventional projection lenses as those described in the above patents encompass a focal length range of approximately 275 to 355 mm. For the magnification range through which this type of projection lens is used, a projection distance is obtained that places the overhead projector a few feet from the projection screen. For example, using a typical 350 mm focal length projection lens at 5.7× magnification, the projector is between seven and eight feet from the projection screen.

For many room and audience configurations, this distance between the projector and the screen results in partial blockage of the screen by the projector and the presenter. A better arrangement would result if the presenter and projector were moved to a position near the side and front of the audience, with the projection screen remaining approximately centered with respect to the audience. This would give the entire audience a clear view of the screen, yet enable the presenter to maintain eye contact with the audience. To achieve such an arrangement, the projection distance from the overhead projector to the screen must be increased to about one and one-half times the normal projection distance, without increasing the size of the projected image.

This longer projection distance requires a longer focal length projection lens than the conventional two-element assembly. For example, to provide a projection distance of between 11 and 12 feet at 5.67× magnification, a projection lens having a focal length near 525 mm would be required. For the type of projection lenses normally used in overhead projectors, this longer focal length results in an increase in the back focal distance of about 60%. The projection lens assembly is then incompatible with normal overhead projector focus adjustment ranges, and also with the focal length of the Fresnel condensing lens typically contained within the overhead projector. To overcome this problem, overhead projectors have been modified to include longer focusing post lengths, and longer focal length Fresnel lenses. These modified machines are usually awkward in appearance, difficult to transport and require larger diameter projection lenses.

U.S. Pat. No. 4,350,415 attempts to increase the projection distance of a conventional two-element projection lens assembly by adding a pair of auxiliary positive and negative meniscus lenses to increase its focal length from 355 mm to 530 mm. By introducing a telephoto ratio of 0.87, the back focus distance at 5.7× magnification is reduced to about 388 mm, at a projection distance of about 12 feet. However, the back focus distance is still too high to be compatible with conventional overhead projectors for smaller size screens. The lens assembly is, therefore, not usable with these overhead projectors over their entire operating range. Also, the resulting chromatic aberration caused by the auxiliary meniscus lenses using the same type of dispersive glass as the conventional projection lenses results in color fringing in the projected image.

SUMMARY OF THE INVENTION

The present invention consists of a four-element telephoto projection lens assembly for use with conventional overhead projectors. The lens assembly consists of two groupings of two lens elements each, separated by a folding mirror. The projection lens assembly affords an extended projection distance from the lens assembly to a projection screen while retaining substantially the same back focus distance as conventional two-element projection lenses for overhead projectors and particularly includes in order from the overhead projector stage to the projection screen a first negative meniscus lens airspaced from a first positive double convex lens which is airspaced from a second negative meniscus lens in contact with a second positive double convex lens. The lens assembly has a focal length of 525 mm, a back focus distance of about 350 mm at 5.7× magnification and a projection distance of about 3750 mm.

The projection lens assembly of the present invention further includes a mirror positioned between the first positive double convex lens and the second negative meniscus lens for folding the light path from vertical to horizontal and uses glasses of selected dispersions, as measured by the dispersive index or Abbe-number of the lenses, to provide color correction of the image projected.

BRIEF DESCRIPTION OF THE DRAWING

The present invention will be more particularly described with respect to the accompanying drawing, wherein:

FIG. 1 is a schematic view of a projection lens assembly constructed in accordance with the present invention.

DESCRIPTION OF THE PREFERRED EMBODIMENT

Referring now to the Figure there is illustrated a compact projection lens assembly for use in an overhead projector which permits a folding of the projected light from a vertical path from a projection stage of the overhead projector to a horizontal path to direct the projected light onto a remote projection screen. The stage and screen are not illustrated. The lens assembly of the present invention is preferably mounted for movement along the vertical portion of the optical axis toward and away from the stage. The projection lens assembly illustrated in the Figure comprises a first negative meniscus lens 1 which is airspaced from a first positive double convex lens 2 airspaced from a second negative meniscus lens 3 which is in contact with a second positive double convex lens 4. Positioned between the first positive double convex lens 2 and the second negative meniscus lens 3 is a plane mirror 5 which is oriented to fold light passing through the projector stage from a vertical path to a horizontal path and direct this light to the projection screen. The optical axis of light through the projection lens assembly is illustrated by the line 6.

The mirror 5 and the lenses 3 and 4 are movable to afford a tilt capability to the projected image to move the same up and down on the screen in the manner well known in the art as an "articulating" arrangement wherein the lenses 3 and 4 pivot at twice the angular rate of pivotal movement of the mirror 5.

A first specific embodiment of the lens assembly of the Figure is listed below in Table 1, wherein the respective lens are recited together with the corresponding refractive indices N for the D line of the spectrum, the corresponding dispersive indices or Abbe-number V are given for each lens and the radii of curvature R of each surface of each lens is given. The respective surfaces are numbered in sequence and indicated by subscript in the same order as the lenses are numbered and are consecutively numbered from the stage toward the screen with plus and minus values of R indicating surfaces which are respectively convex and concave to radiation entering the front surface of the lens (the surface closest to the stage). The axial thickness T of the respective lenses and the air spaces S between the lenses are also recited with the respective lens thickness T being identified for each lens by the corresponding subscript and the air spaces S between the lens elements being also identified by subscripts numbered in sequence in the same order as the lenses. The quantities of the radii R, thickness T and spacing S are expressed in millimeters.

TABLE 1

| Lens | $N_d$ | V | Radii mm | T mm | S mm |
|---|---|---|---|---|---|
| 1 | 1.6204 | 60.33 | $R_1 = 543.90$ | $T_1 = 6.00$ | $S_1 = 24.21$ |
|   |   |   | $R_2 = 94.11$ |   |   |
| 2 | 1.6477 | 33.85 | $R_3 = 230.10$ | $T_2 = 12.00$ | $S_2 = 109.27$ |
|   |   |   | $R_4 = -3264.78$ |   |   |
| 3 | 1.7174 | 29.51 | $R_5 = -144.09$ | $T_3 = 3.65$ | $S_3 = 0.00$ |
|   |   |   | $R_6 = -578.40$ |   |   |
| 4 | 1.5168 | 64.17 | $R_7 = 838.20$ | $T_4 = 12.70$ |   |
|   |   |   | $R_8 = -91.00$ |   |   |

For the lens assembly described by the parameters of Table 1, the lens 1 has an equivalent focal length of −184.37 mm and a nominal diameter of 100 mm, lens 2 has an equivalent focal length of 332.32 mm and a nominal diameter of 95 mm, lens 3 has an equivalent focal length of −268.44 mm and a nominal diameter of 65 mm and lens 4 has an equivalent focal length of 159.58 mm and a nominal diameter of 75 mm. The lens assembly has a focal length of 525.09 mm, a total length of 167.80 mm, a back focus at 5.71× magnification of 351.35 mm, a projection distance at 5.71× magnification of 3752 mm and a telephoto ratio, defined as the lens assembly length plus the back focus distance of the lens assembly divided by the focal length of the lens assembly, of 0.81.

A second embodiment of a lens assembly of the present invention is indicated in Table 2 wherein the definitions of the quantities involved and the numbering convention of the lens are the same as described with respect to Table 1.

TABLE 2

| Lens | $N_d$ | V | Radii mm | T mm | S mm |
|---|---|---|---|---|---|
| 1 | 1.6204 | 60.33 | $R_1 = 578.40$ | $T_1 = 6.00$ | $S_1 = 23.00$ |
|   |   |   | $R_2 = 93.00$ |   |   |
| 2 | 1.6889 | 31.18 | $R_3 = 245.00$ | $T_2 = 12.00$ | $S_2 = 108.30$ |
|   |   |   | $R_4 = -5080.00$ |   |   |
| 3 | 1.7552 | 27.58 | $R_5 = -150.70$ | $T_3 = 3.00$ | $S_3 = 0.00$ |
|   |   |   | $R_6 = -570.14$ |   |   |
| 4 | 1.5168 | 64.17 | $R_7 = 762.20$ | $T_4 = 12.00$ |   |
|   |   |   | $R_8 = -90.42$ |   |   |

The lens assembly defined by the values of Table 2 has a focal length of 524.63 mm, a total length of 164.30 mm and a telephoto ratio of 0.81. For lens 1 the equivalent focal length is −179.47 mm, the equivalent focal length of lens 2 is 339.59 mm, the equivalent focal length of lens 3 is −272.08 mm and the equivalent focal length of lens 4 is 157.15 mm. Nominal lens diameters are the same as those stated with respect to the lens assembly of Table 1. The projection distance at 5.71× magnification of the lens assembly defined by the lens parameters of Table 2 is 3757 mm and the back focus is 350.14 mm.

When a number of lenses are used in series, as in the present invention, a common problem is color fringing of the projected image due to a similar dispersion or dispersive index of the glass used in the manufacture of the lens. Dispersion of a lens refers to the property of glass to refract different wavelengths of light differently and is considered high when the change in refraction by wavelength is high and low when different wavelengths are refracted to a more similar extent. It will be noted from Tables 1 and 2 that the dispersion, as measured by the dispersive index or Abbe-number V, is high for the first positive double convex lens 2 and the second negative meniscus lens 3 relative to the first negative meniscus lens 1 and the second positive double convex lens 4. This arrangement of lenses having different dispersion qualities eliminates or greatly reduces color fringing.

Having disclosed the present invention with respect to two illustrative embodiments, it will be understood that proportional changes may be made in the lens assembly and not depart from the present invention as disclosed in the accompanying claims.

I claim:

1. A lens assembly for use in an overhead projector for projecting an image from a transparency stage to a projection screen, said lens assemlby affording an extended projection distance from said lens assembly to said projection screen while retaining substantially the same back focus as a two-element projection lens for overhead projectors, comprising in order from said stage to said screen a first negative meniscus lens airspaced from a first positive double convex lens which is airspaced from a second negative meniscus lens in contact with a second positive double convex lens.

2. A lens assembly for use in an overhead projector according to claim 1 further including a mirror positioned between said first positive double convex lens and said second negative meniscus lens for folding the light path through said lens assembly.

3. A lens assembly for use in an overhead projector according to claim 1 having a telephoto ratio, defined as the length of said lens assembly plus the back focus distance of said lens assembly divided by the focal length of the lens assembly, of approximately 0.81.

4. A lens assembly for use in an overhead projector according to claim 1 wherein said first positive double convex lens and said second negative meniscus lens have high dispersion relative to said first negative meniscus lens and said second positive double convex lens, as measured by the Abbe-number of said lenses, to provide color correction of said image projected by said lens assembly.

5. A lens assembly for use in an overhead projector according to claim 1 wherein the characteristics of said lenses and their spatial relationship are substantially the same as in the following table:

| 1 | 1.6204 | 60.33 | $R_1 =$ 543.90 | $T_1 =$ 6.00 |
|---|---|---|---|---|
|   |        |       | $R_2 =$ 94.11 | $S_1 =$ 24.21 |
| 2 | 1.6477 | 33.85 | $R_3 =$ 230.10 | $T_2 =$ 12.00 |
|   |        |       | $R_4 =$ −3264.78 | $S_2 =$ 109.27 |
| 3 | 1.7174 | 29.51 | $R_5 =$ −144.09 | $T_3 =$ 3.65 |
|   |        |       | $R_6 =$ −578.40 | $S_3 =$ 0.00 |
| 4 | 1.5168 | 64.17 | $R_7 =$ 838.20 | $T_4 =$ 12.70 |
|   |        |       | $R_8 =$ −91.00 |   | wherein the respective lenses are numbered from the stage toward the screen in the first column, the corresponding refractive indices N for the D line of the spectrum are given in the second column, the corresponding dispersive indices V are given in the third column, the radii of curvature R of the lens surfaces are given in the fourth column, the respective surfaces being numbered in sequence in the same order as the lenses and being respectively identified by the subscript numeral used with each R, plus and minus values of R indicating surfaces which are respectively convex and concave to radiation entering the lens from the stage; the axial thicknesses T of the respective lens elements and the air spaces S between lenses are given in the fifth column, the respective thicknesses T of the lenses and the air space S between lenses being identified by subscripts numbered in sequence in the same order as the lenses; and the quantities R, T, and S being expressed in millimeters.

6. A lens assembly for use in an overhead projector according to claim 1 wherein the characteristics of said lenses and their spatial relationship are substantially the same as in the following table:

| 1 | 1.6204 | 60.33 | $R_1 =$ 578.40 | $T_1 =$ 6.00 |
|---|---|---|---|---|
|   |        |       | $R_2 =$ 93.00 | $S_1 =$ 23.00 |
| 2 | 1.6889 | 31.18 | $R_3 =$ 245.00 | $T_2 =$ 12.00 |
|   |        |       | $R_4 =$ −5080.00 | $S_2 =$ 108.30 |
| 3 | 1.7552 | 27.58 | $R_5 =$ −150.70 | $T_3 =$ 3.00 |
|   |        |       | $R_6 =$ −570.14 | $S_3 =$ 0.00 |
| 4 | 1.5168 | 64.17 | $R_7 =$ 762.20 | $T_4 =$ 12.00 |
|   |        |       | $R_8 =$ −90.42 |   | wherein the respective lenses are numbered from the stage toward the screen in the first column, the corresponding refractive indices N for the D line of the spectrum are given in the second column, the corresponding dispersive indices V are given in the third column, the radii of curvature R of the lens surfaces are given in the fourth column, the respective surfaces being numbered in sequence in the same order as the lenses and being respectively identified by the subscript numeral used with each R, plus and minus values of R indicating surfaces which are respectively convex and concave to radiation entering the lens from the stage; the axial thicknesses T of the respective lens elements and the air spaces S between lenses are given in the fifth column, the respective thicknesses T of the lenses and the air spaces S between lenses being identified by subscripts numbered in sequence in the same order as the lenses; and the quantities R, T, and S being expressed in millimeters.

* * * * *